UNITED STATES PATENT OFFICE.

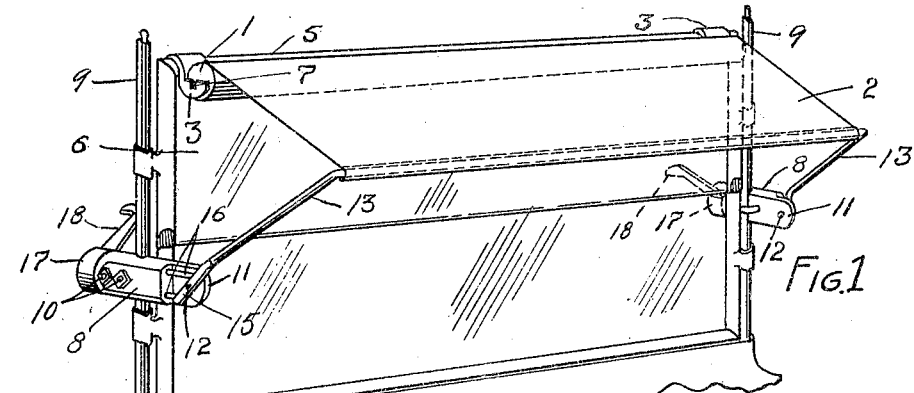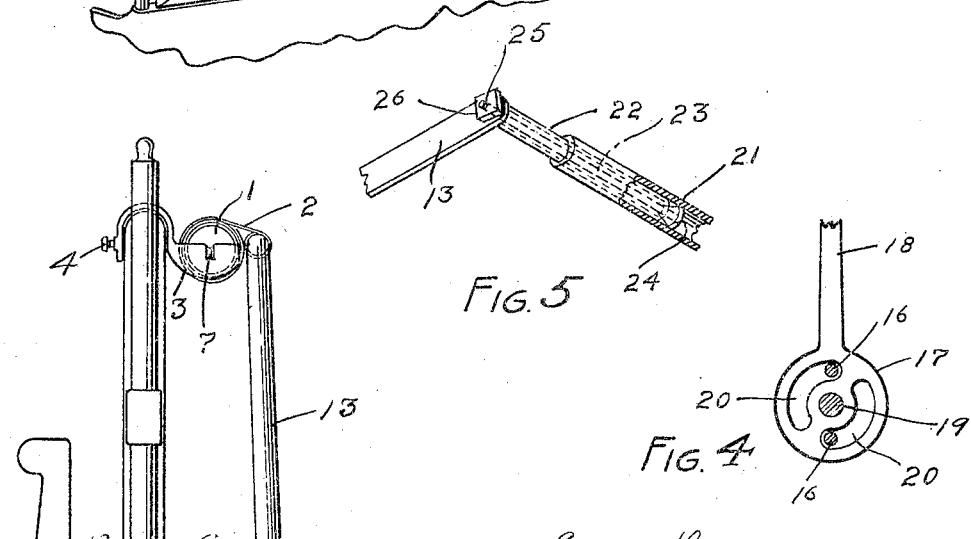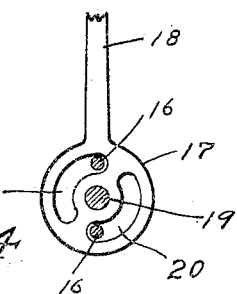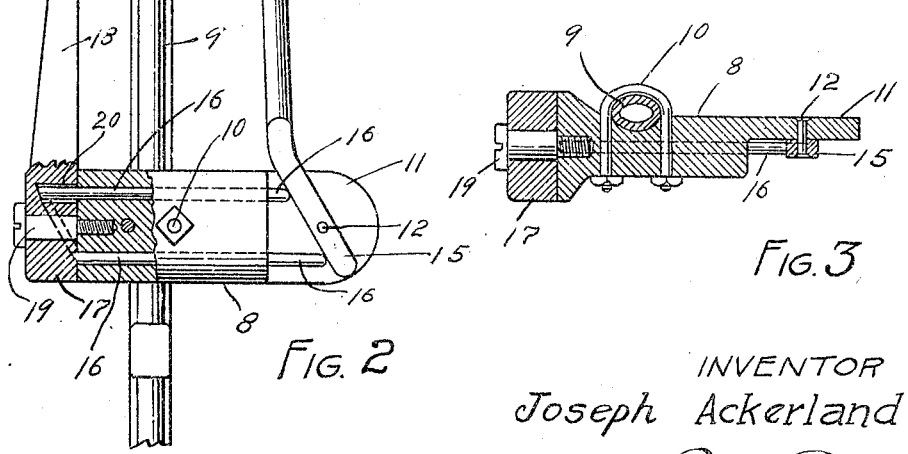

JOSEPH ACKERLAND, OF MINNEAPOLIS, MINNESOTA, ASSIGNOR TO GEORGE M. SEEMANN, OF MINNEAPOLIS, MINNESOTA.

WINDSHIELD-SHADE.

1,378,509.  Specification of Letters Patent.  Patented May 17, 1921.

Application filed April 13, 1920. Serial No. 373,620.

*To all whom it may concern:*

Be it known that I, JOSEPH ACKERLAND, a citizen of the United States, resident of Minneapolis, Hennepin county, State of Minnesota, have invented certain new and useful Improvements in Windshield-Shades, of which the following is a specification.

This invention relates to an improved wind-shield shade or awning adapted for use in connection with automobiles or similar vehicles, to prevent the passage of certain intense direct rays of light through the wind-shield, and to prevent ice, rain, and snow from being driven against, and from accumulating upon, the glass. It is particularly useful in driving an automobile in the direction of the sun, as for example, when the sun is becoming low in the sky. The direct rays of the sun in such position interfere with the clear vision of the vehicle operative and this shade or awning is adapted to be adjustably lowered to shade the operative's eyes from these direct rays. This novel construction provides a shade which is adjustable to different protective angles, and to different widths of windshield and is easily and readily operable from the operative's seat.

The object of the invention therefore is to provide an improved wind-shield.

Other objects of the invention will more fully appear from the following description and accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the drawings:

Figure 1 is a perspective of the novel shade as applied to the usual automobile wind-shield;

Fig. 2 is a partial section of the frame-operating means;

Fig. 3 is a section through the brackets;

Fig. 4 is a view of the pin-operating device; and

Fig. 5 is a perspective of the adjustable frame member.

The present awnings or shading devices adapted for use with the wind-shield of automobiles have a spring-actuated shade-roller adjacent the top of the wind-shield which roller normally tends to wind the shade thereon. Such present devices also, have a substantially U-shaped frame to which the other end of the shade is attached which frame is pivotally mounted on the wind-shield. Such old constructions further employ flexible members adapted to be rolled up on the rollers with the shade and are either attached to a part of the shield or automobile, to hold the tensioned shade in adjusted position, or, are provided with more or less complex spring devices which are easily deranged and which do not stand up under road conditions.

This novel structure provides a manually operable mechanism whereby the shade may be rolled up or moved into adjusted positions, and frictionally maintained thereat. In the selected embodiment of the invention here shown, there is provided a spring-actuated shade-roller 1 which is of the common type and is not necessary to be shown or described in detail. A flexible shade 2 is adapted to be wound thereon under tension of the roller spring. One end portion of the shade is secured to the roller in accordance with common practice while the other end portion of the shade is secured to a member such as a substantially U-shaped frame. While the shade-roller here shown as mounted adjacent the top of the wind-shield, it is obvious that the roller may be mounted on the frame and the other end portion of the shade secured to the wind-shield top. However, it is preferable in practice to mount the roller adjacent the wind-shield top and it is here shown as held in two brackets 3 secured by the wing-nuts 4 to the cross-bar 5 of the wind-shield 6. One pivot of the roller, in accordance with the common practice in window shade-rollers, is held against rotation by means of the angular socket 7 formed in a portion of the bracket 3.

The frame member is preferably pivotally mounted adjacent the wind-shield and is adapted to stretch the shade in forwardly extended position across the wind-shield as the shade is unrolled by movement of the frame member. A pair of brackets 8 are mounted adjacent the wind-shield and one each side thereof, being here shown as secured to the wind-shield supports 9 by means of the U-bolts 10. The brackets and frame operating mechanism are similar and therefore it is necessary to describe but one. The brackets 8 are provided with a forwardly extending portion such as a plate 11, providing a pivot pin 12 to mount the adjacent arm 13 of the frame member. The arms 13 are preferably terminally provided with flattened, angularly disposed working portions 15 which are apertured to permit passage therethrough of the pin 12 whereby the working portion 15 of each arm is pivotally mounted on one of the brackets 8. A frictional means is provided to turn the arms and therefore the frame member about these two pivots 12. Such an operating means is preferably provided on each side of the wind-shield and are similar. The bracket is preferably formed with a cylindrical portion apertured to provide ways for the elements which are movable to exert force on the working portion 15 on sides opposite with respect to the pivot thereof. These elements comprise a pair of pins 16 having their outer portions projecting from the cylindrical portion and extending over the surface of the plate 11 to engage each one of the pivotally opposite side faces of the working portion 15 of the arm.

As these pins 16 engage the adjacent face of the working portion 15 on opposite sides of its pivotal mounting, it is obvious that there must be provided a means for reversely reciprocating these pins in order to turn the frame member in either direction. Such a device is shown as a manually operable member and is partially shown in Fig. 4.

This manually operable means consists preferably of a substantially cylindrical body 17 provided with a handle 18 by which means it may be rotated upon an axis provided by the stud 19 carried by the cylindrical portion of the bracket 8. A pair of oppositely inclined surfaces are formed on this body 17 in order that the outer ends of the pins may cam up and down these surfaces to turn the arms 13. In the selected form here shown, these surfaces are presented by arcuate grooves 20 disposed on the inner face of the body 17. While the outer ends of the pins may be terminally rounded as the inner ends thereof, it is preferable to cut off the pins at the outer ends at an incline to the longitudinal axes thereof in order that they may be provided with an increased area of contact with the inclined grooves 20. Such increased area of contact affords a better frictional contact between the pin ends and the inclined surfaces of the grooves so that when the frame member is turned into the desired position, it is held against displacement therefrom by this frictional resistance to movement.

Means are provided in this novel wind-shield shade whereby it may be adjusted to varying widths of vehicle wind-shields. To this end, the frame member is formed with a tubular bar 21 to which is secured one end portion of the flexible shade 2. A tubular rod 22 is received in each end of the tubular bar so that the member may be longitudinally adjusted. Means are provided in each tubular rod for terminally expanding the rod to hold each rod frictionally in adjusted position. A long pin or rod 23 is provided with a tapered end portion 24 and one such rod is placed within each tubular rod 22 and is adapted to be pulled outwardly so that the end portion of the tubular rod 22 will annularly outwardly force the terminal portions of the rods 22 against the inside of the tubular bar 21 and attain a frictional retention of the tubular rods 22 and the bar 21. This pin or rod 23 is provided with screw-threads adjacent the terminus of the portion which projects from the tubular rod 22. This threaded portion 25 is inserted in an aperture formed in the modified form of arm 13 shown in Fig. 5. A nut 26, functions upon turning down, to outwardly draw the tapered rod and to hold the rod in such position.

Having thus described my invention, what I claim as new and desire to secure by Letters Patent, is:

1. In a wind-shield, a flexible shade, a spring-actuated shade-roller having one end of the shade secured thereto and normally tending to wind the shade thereon, means operatively to mount said roller adjacent the top of said wind-shield, a member connected to said shade near its opposite end to stretch the shade in forwardly extended position across the wind-shield as the shade is unrolled, a pivotal mounting for said member adjacent said wind-shield, and means bodily movable to engage said member on opposite sides of the pivot thereof whereby the shade may be held in rolled-up or extended positions.

2. In a wind-shield, a flexible shade, a spring-actuated shade-roller having one end of the shade secured thereto and normally tending to wind the shade thereon, means operatively to mount said roller adjacent the top of said wind-shield, a member connected to said shade near its opposite end to stretch the shade in forwardly extended position across the wind shield as the shade is unrolled, a pair of longitudinally movable elements mounted to engage said member on opposite sides of its pivot and manually operable means for reversely projecting said elements to turn the member in either direction.

3. In a wind-shield, a flexible shade, a spring-actuated shade-roller having one end of the shade secured thereto and normally tending to wind the shade thereon, means operatively to mount said roller adjacent the top of said wind-shield, a member connected to said shade near its opposite end to stretch the shade in forwardly extended position across the wind-shield as the shade is unrolled, a pivotal mounting for the member adjacent the wind-shield, a pair of movable elements mounted to engage said member on opposite sides of the pivot, and a manually operable instrumentality presenting reversely inclined surfaces simultaneously and oppositely to reciprocate said elements to turn the member in either direction.

4. In a wind-shield, a flexible shade, a spring-actuated shade roller having one end of the shade secured thereto and normally tending to wind the shade thereon, means operatively to mount said roller adjacent the top of said wind-shield, a member connected to said shade near its opposite end to stretch the shade in forwardly extended position across the wind-shield as the shade is unrolled, a pivotal mounting for the member adjacent the wind-shield, a pair of movable elements mounted to engage said member on opposite sides of its pivot and adapted to turn the member in either direction, a manually rotatable instrumentality mounted to engage both elements and having a pair of reversedly inclined arcuate grooves oppositely disposed about the axis of rotation of said instrumentality, said elements having portions extending into said grooves whereby the member may be turned upon rotation of said instrumentality.

5. In a wind-shield, a flexible shade, a spring-actuated shade-roller having one end of the shade secured thereto and normally tending to wind the shade thereon, means operatively to mount said roller adjacent the top of said wind-shield, a member connected to said shade near its opposite end to stretch the shade in forwardly extended position across the wind-shield as the shade is unrolled, said member including a tubular bar, a tubular rod adapted to be inserted in each end of the tubular bar whereby said member may be longitudinally adjusted, a rod extending within said tubular rod and having a tapered inner end adapted upon outward movement of said rod to expand the tubular rod whereby the tubular rod is frictionally held in said tubular bar, a terminally apertured arm mounted adjacent each side of the wind-shield and adapted to receive each an outer end of said rod, the outer portion of said rod being threaded to receive a nut whereby upon turning down of the nut said rod is outwardly moved and the tubular bar and the tubular rod held in adjusted frictional engagement.

In witness whereof I have hereunto set my hand this 8th day of April, 1920.

JOSEPH ACKERLAND.